United States Patent
Schmutz et al.

(10) Patent No.: US 11,113,715 B1
(45) Date of Patent: Sep. 7, 2021

(54) DYNAMIC CONTENT SELECTION AND OPTIMIZATION

(71) Applicant: Amazon Technologies, Inc., Reno, NV (US)

(72) Inventors: Michael Schmutz, Edinburgh (GB); Aigars Reiters, Edinburgh (GB)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 534 days.

(21) Appl. No.: 15/815,008

(22) Filed: Nov. 16, 2017

(51) Int. Cl.
  *G06Q 30/02* (2012.01)
  *H04L 29/08* (2006.01)

(52) U.S. Cl.
  CPC ..... *G06Q 30/0243* (2013.01); *G06Q 30/0201* (2013.01); *G06Q 30/0254* (2013.01); *H04L 67/22* (2013.01)

(58) Field of Classification Search
  USPC ........................................... 706/12; 715/530
  See application file for complete search history.

(56) References Cited

U.S. PATENT DOCUMENTS

| | | | |
|---|---|---|---|
| 2004/0123247 A1* | 6/2004 | Wachen | G06F 17/243 715/267 |
| 2015/0095271 A1* | 4/2015 | Ioannidis | G06Q 30/02 706/12 |

* cited by examiner

*Primary Examiner* — Afaf Osman Bilal Ahmed
(74) *Attorney, Agent, or Firm* — Hogan Lovells US LLP

(57) ABSTRACT

Various embodiments of a framework which allow dynamic testing of many creative content and other messages simultaneously using metrics-based optimization. A "multi-armed bandit" algorithmic approach employed, as an alternative to limited AB-type testing, to automatically select a set of content parameters based on the content parameters' respective probabilities, render the selected parameters to generate content sent to a user, and, after obtaining feedback in the form of user interaction data, update the parameters for future, iterative selection of content parameters. This framework can be used in essentially any setting to allow for the provision of feedback, including user interaction data.

15 Claims, 5 Drawing Sheets

DYNAMIC CONTENT SELECTION AND OPTIMIZATION

BACKGROUND

Parties offering products and services continually seek to improve the creative or advertising experience for potential customers. In current commercial circles, dynamic advertising endeavors to use technology, in the form of seed-based templates and tracked metrics, to present measurably and personally useful creative messaging to customers. Such a better-targeted creative experience yields penetration with useful recommendations. For the creative stream in online advertising/e-commerce, this is interpreted as showing creatives which primarily improve click-through rate (CTR) and conversion rate (CVR).

Content such as advertising consists of features and elements such as titles, price information, and logos, with those elements having parameter values representing factors such as color, size, etc. And a challenge in experimentation within dynamic advertising is how to select from different element and parameter treatments for which human judgment is typically relied. Historically, this need has been addressed with "A/B"-type testing, which is limited to testing a combination of only two creative messages at a time: comparing a control (representing knowledge currently held) with a treatment (the subject being tested). A period of pure exploration is used, where testing-subject customers are evenly divided and assigned a customer to either the control message or the treatment message. The resulting winner is then manually inserted as the control for future experiments.

This AB-type strategy of exploring and exploiting is inefficient for several reasons: (i) it can only test a small number of combinations at a time; (ii) it wastes resources exploring inferior options; (iii) it does not allow to evaluate new experiments in the exploitation (of preferred options) phase; (iv) the best global option may be suboptimal compared to the best options identified on specific subpopulations (i.e., deal seed sources or individual customers); (v) it fails slowly—creatives rejected in a subtle way can take multiple weeks to detect; and (vi) it does not allow the tester to continuously add or modify experiments. Further, if traditional online advertising is tested during this process, it is not well-suited for such and consists only of static-coded, inflexible HTML (Hypertext Markup Language) pages written in Java, without the notion of dynamic parameters or elements.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to selecting from among different element and parameter treatments in content such as visual parts of advertising and other creative content and media. Disclosed is a framework for dynamically and automatically testing many creative content messages simultaneously using metrics-based optimization via algorithms such as a "multi-armed bandit" approach, as opposed to AB-type testing, which limits creative optimization.

Figure 1A:
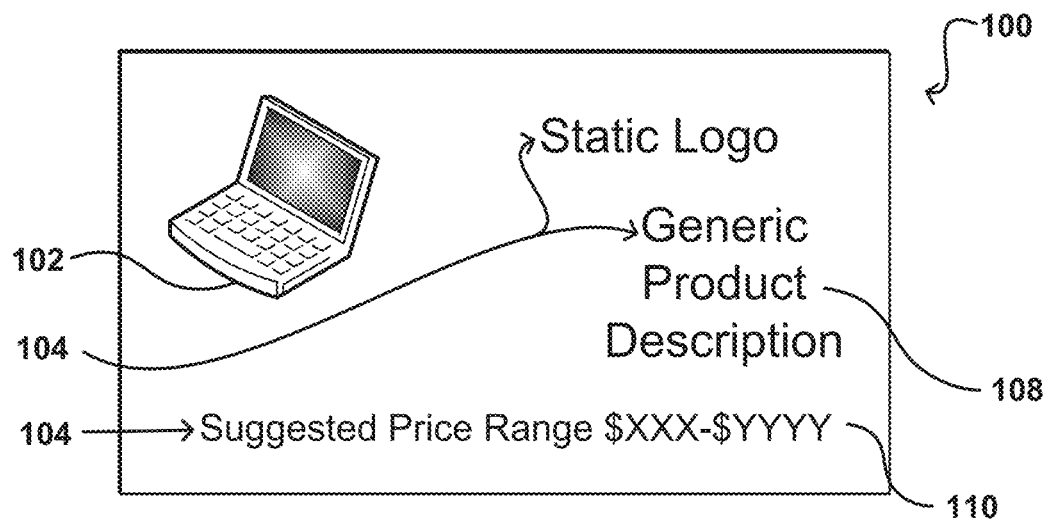
FIG. 1A illustrates a representative piece of creative content prior to optimization in accordance with various embodiments.
Figure 1B:
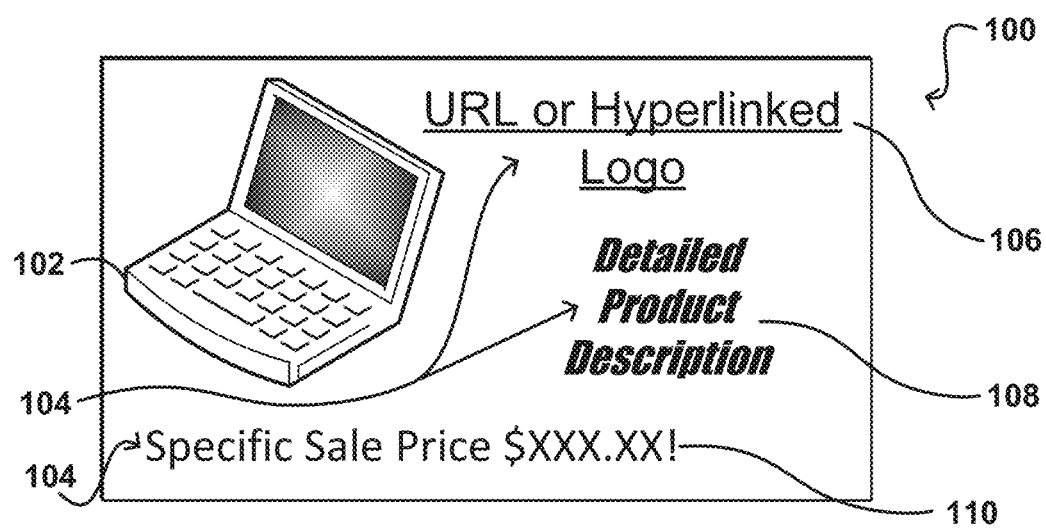
FIG. 1B illustrates the representative piece of creative content following optimization in accordance with various embodiments.
Figure 2A:
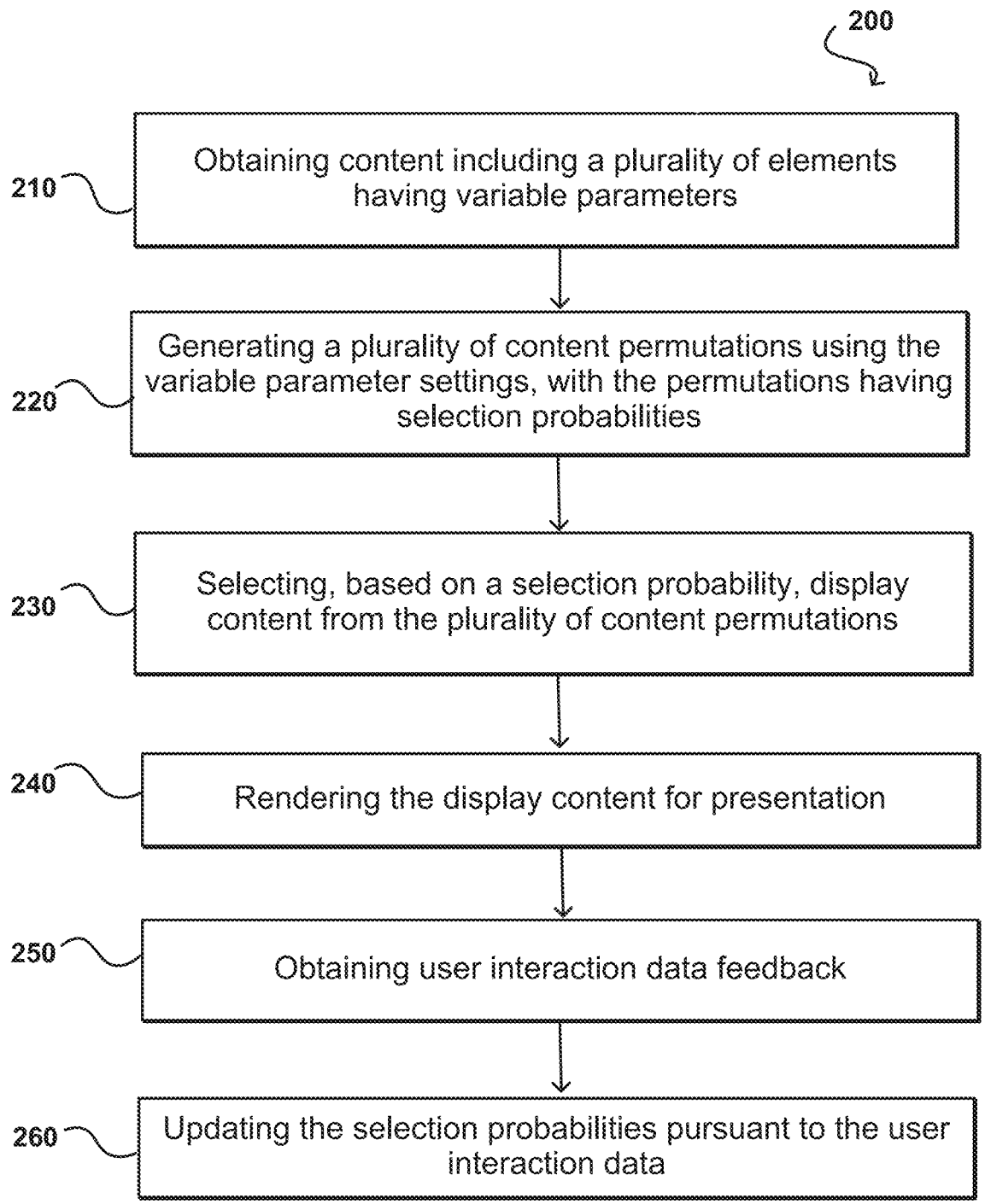
FIG. 2A illustrates a representative process for dynamically optimizing content in accordance with various embodiments.
Figure 2B:
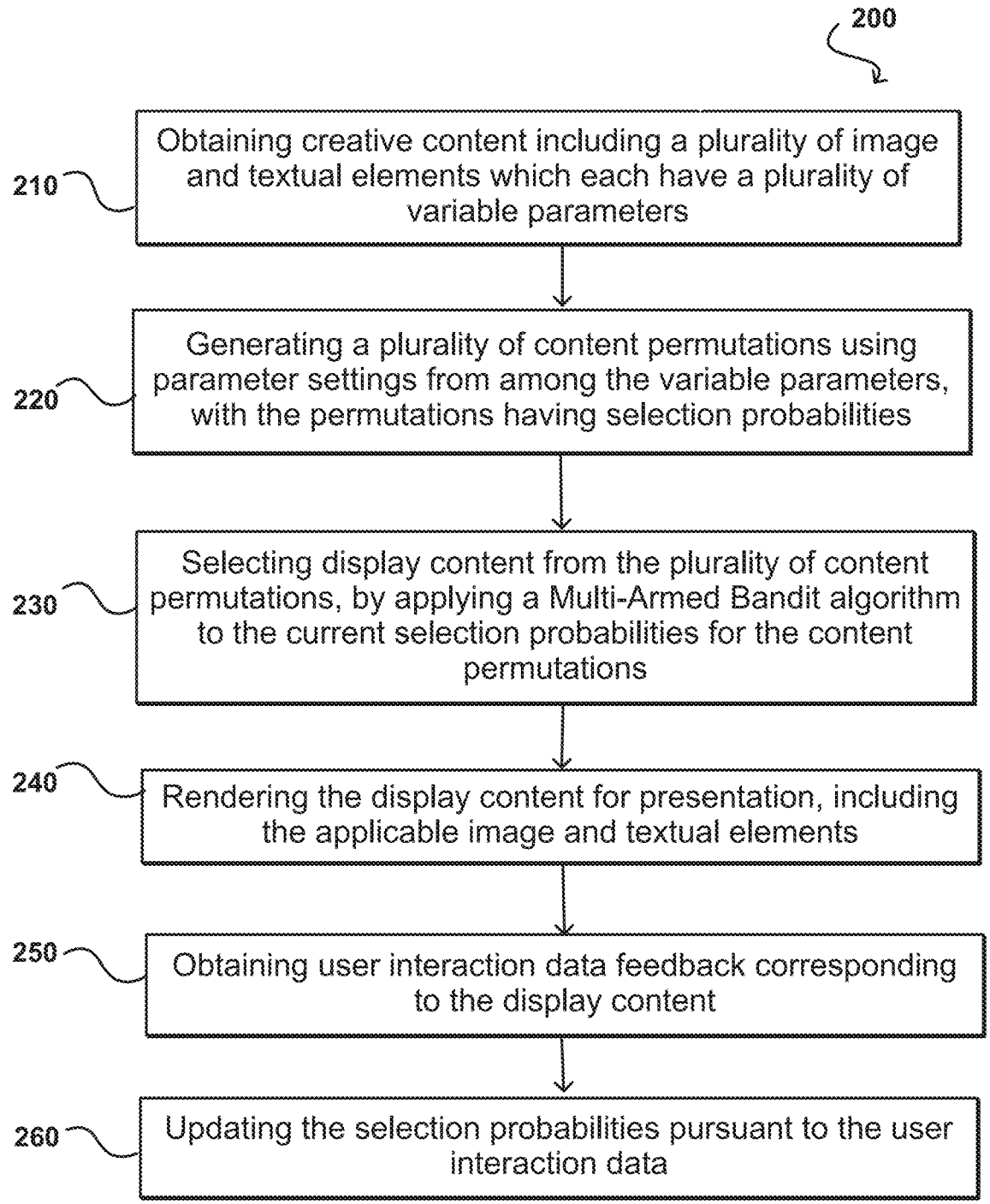
FIG. 2B illustrates a representative process for dynamically optimizing content in accordance with various embodiments.

FIG. 1A illustrates an example of creative content 100 capable of being selected and optimized through the present computer-implemented, automated, iterative processes and systems, while FIG. 1B shows the creative content 100 following its optimization. Included in these sample content 100 illustrations are a product 102 for sale and example elements 104 such as a logo 106, a description 108 of the product 102, and a price 110 of the product 102. A representative process 200 is shown in FIGS. 2A (at a higher-level) and 2B (at a lower-level), where a first step 210 involves creating, selecting, or otherwise obtaining content 100 including a plurality or set of elements 104, the elements 104 having a plurality of variable, and adjustable, parameters. A second step 220 can entail generating a plurality of content 100 permutations, using parameter settings from among the elements' 104 variable parameters, with the content 100 permutations having respective selection probabilities. Additional steps 230 and 240 respectively involve selecting display content 100 from among the plurality of content 100 permutations, based on the selection probability for a corresponding content 100 permutation, and rendering the image and textual elements of the display content 100 for presentation or display to a potential customer or other user. The display selection process can involve content 100 permutation selection probability scores, rankings, and/or a random number-based approach, selecting a content 100 permutation based on probabilities. Subsequently, obtaining user interaction data feedback corresponding to the display content 100 is obtained during step 250. At step 260, the permutation selection probability scores are updated in light of the user interaction data. As discussed herein, this interaction data feedback from the user can be used to ascertain a desired, or perhaps "the best," combination or permutation of elements 104 and update the selection probabilities accordingly. The present systems and methods can be applied to different parameter tweaking and creative content 100 version evaluation scenarios as live feedback is read.

More particularly, the present systems and methods, then, will take the defined creative content 100 visual features and elements 104 and automatically create and test, for preferability, all possible combinations of those elements. A list of element 104 combinations can be stored in a database or data store, with each combination or permutation having a probability of being selected and being shown to a user. Initially in the creative content 100 experiments in the form of the testing, each permutation has an equal chance of being selected. When a user, potentially in the form of a customer, arrives at a website presenting creative content 100 permutations, a permutation is randomly selected based on the current probabilities stored in the system. The permutation is presented to the user, after the parameters are applied to generate the creative content 100 HTML. Interaction data feedback from the user may be obtained at that point, and then the selection probabilities are updated in light of the most recent aggregated feedback. Additionally, new versions can be added mid-experiment, as the selection probability updating process continues, and poorly-performing ones can eventually be eliminated from the experiment. In at least one illustrative embodiment, a builder software module is used to build the various element 104 permutations or combinations comprising the creative content 100; collect all of the user interaction data feedback; and update and compute, in light of such feedback, the respective probabilities that the permutations will be selected for presentation to other users.

Content 100 permutation performance may be judged as successful or unsuccessful in any number of ways, with metrics certainly contemplated to progressively show the best creative content. If a particular permutation shown performs badly, the probability of that permutation being selected for future content presentations will be reduced; conversely, if a permutation performs well, its selection probability will be increased. Eventually the best permutation will stand out, by its probability, which the other permutations being tested will have selection probabilities approaching or equaling zero and thus be eliminated. Based on the interaction feedback and elimination process, it will be possible to answer questions such as whether it is preferable to show a price in the creative content, whether it is preferable for the content 100 to have a big or small title, and whether certain colors are well suited for the content. In addition to the fast-failing aspect, where unpopular creative content 100 is eliminated quickly, the present systems and methods provide improved customer experiences through vetted creative content 100 and increased sales as a result.

The automatic creative selection and optimization herein improves the customer experience through the identification of creative content 100 elements 104, which are features of the creative content 100 that can be experimented upon by adjusting parameters within a defined range. This exhaustive approach creates a range of potential testing, allowing for an exploration of all combinations without the initial overhead of explicit design and can be used in essentially every setting to allow for the provision of feedback in the form of user interaction data and to take advantage of specific, unique data to intelligently deliver measurably useful content 100 to customers and other users. Various other functions can be implemented within the various embodiments as well as discussed and suggested elsewhere herein.

In various embodiments, the content environment (i.e., a "multi-tenant environment") may include various types of electronic resources that can be utilized concurrently by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, web services, or "cloud computing," among other such terms and depending upon the specific environment and/or implementation.

Selection of Content Elements and Their Parameters

In various embodiments, each piece of creative content 100 has a plurality of features and elements 104, and each visual element has its own set of parameters. A visual element 104 can be thought of as either: an atomic element (i.e., an image or textual element) or a container, which contains a set of visual elements (atomic elements) as well as other containers. The parameter-set visual elements 104 which are combined and presented can include any of a number of components and other things, such as a title or name of an item or service, an image (potentially a product 102 or logo 106 and potentially hyperlinked with a Uniform Resource Locator (URL) address), a product description 108, a price 110, and reviews (including a simple "star"-based presentation based on prior reviews).

For example, available parameter settings could include "Always Show," "Show," or "Not Show." Further, each of these elements 104 can vary by parameter settings in numerous other ways, such as by size, font, position, color, opacity, and/or hyperlinked status. In some illustrative embodiments, the elements 104 are created and defined in HTML and modified by a change code. Parts of the creative content 100 can be further categorized into domains, based on the function of the elements 104 within the content. Examples of domains include: logos, titles, product images, and prices. The use of domains allows the encapsulation of metadata and styling parameters, which is unique for each domain. Adding a new domain such as a date-specific badge and choosing which domains make up creative content 100 in a certain order is a straightforward process, making the creative content 100 quite flexible to change.

In various embodiments, a random number is selected, which can be accomplished through a sort of "virtual" dice roll well known in the computer sciences art, and the corresponding permutation entry is selected and passed along by the system for presentation to a user. Once selected, the element 104 and parameter permutation sets can be stored in a file, a database, or a data store, local or networked, for example. However, in terms of resources, storing a large set of element 104 parameters can be expensive. To overcome that issue, an illustrative system or method will, instead of storing the entire set of element 104 parameters, store only the parameter identifications (IDs). This is beneficial as a set of IDs will be much smaller and more scalable, as illustrated by the representative data in the Table 1 below.

TABLE 1

Data File Size for Parameters and IDs
(3 Possible Values per Parameter)

| No. of Parameters | Parameter Set Size | ID Set Size |
|---|---|---|
| 10 | 9.0 MB | 0.4 MB |
| 20 | 3.2 GB | 54.5 MB |

The parameter IDs should at least be able to provide the following: the parameters being styled for the testing process, to which elements 104 they belong, and the range or set of values each parameter can take. With this information, it will be possible to create parameter vectors on the fly, at a small processing cost.

An administrator or content testing designer may use the Cascading Style Sheets (CSS) style sheet language to modify the parameters representing the style and decoration of the creative content 100 elements 104, in ways such as adjusting one or more font sizes, image size(s), and the colors utilized, for example. In at least one illustrative embodiment, CSS is used for describing the parameter presentation of the elements 104, as set forth in a document written in a markup language, and can control the layout of multiple web pages.

Rendering of Content Elements

Having a set of element 104 parameters, the parameters then need to be interpreted in order to generate the specific instances of creative content 100. A modular, template-based approach and a rendering engine-type software module may be used, for example. More particularly, the use of a rendering engine makes it easy to craft new creative content 100 and apply style changes thereto, with the ability to swap an element 104 and/or a parameter for another. More knowledge about the content and layout of the creative content 100 may be ascertained. And such an approach is flexible and allowing easier testing and maintenance as well as some server-side creative content 100 checks, among other benefits.

In an illustrative embodiment, the creative content 100 for rendering may be divided into following element 104 types in a given image or picture: visual elements, image elements, container elements, textual elements, atomic elements, and link elements. Further employed is an "MVC" configuration, comprised of a model (a particular hierarchy of elements), a view (generated by the rendering engine and templates), and a controller (a set of utility classes and jobs on the Apache Spark™ open-source cluster-computing framework). This need not be tied to HTML, which allows analytical separation of the view from the model.

The creative content 100 elements 104, such as a logo 106 or product image 102, may be further categorized into domains based on their function within the content 100 and including metadata and styling parameters. In the interest of accurate preference results, a tester may wish to ensure that radically different styles of creative content 100 are not shown to the same user during a short period of time. Before final rendering of a given piece of creative content 100, a number of checks may be performed, to see whether the content 100 is suitable for rendering (e.g., whether the slot-size is supported). If any of these checks fail or an exception is encountered, the control creative content 104 is simply and this error event is logged by the system.

Evaluating Interaction Data Feedback and Updating Content Selection Probabilities After creative content 100 element 104 selection and rendering, an evaluating and updating step occurs in some illustrative embodiments. The disclosed systems and methods desire to eliminate creative content 100 pieces that are performing poorly in the eyes of the consuming public (or test subjects) and promote those which are doing well. Therefore, such efforts are grounded in user interaction data feedback, which is used to update the probabilities of element 104 selection. In some illustrative embodiments, Apache Spark™ is used to perform the probability and other updates.

With regard to the feedback, the focus in some illustrative embodiments is on metrics. In order to evaluate the performance of a creative content 100 instance once it is rendered, performance metrics must be established. These metrics will be monitored, logged, and interpreted. This process should be automated, having little to no human intervention as the main purpose of the metric evaluation process in its early stages will be to discard unusable and/or poorly performing permutations as quickly as possible.

Dynamic advertising concepts instruct the logging of certain metrics which can be used, such as permutation identifiers, hyperlink clicks by a user, impressions, latency, user opt-outs or "trashes," and client-side error rate. As the metrics need to be tied to whichever creative content 100 is shown, identifiers are added, including things such as a VersionID and a PermutationID.

Multi Armed Bandit Algorithm for Selecting the Best Performing Content

The dynamic creative content 100 optimization techniques herein can use algorithms such as the Multi-Armed Bandit (MAB) to progressively automatically select the best performing versions of creative content 100, based on user interaction data in the form of such metrics. The systems and methods herein use MAB, for example, to allow for testing of a very high number of versions, eliminating the several limitations of A/B testing.

A theoretical concept grounded in the idea of a gambler selecting the best-performing slot machine (nicknamed a "one-armed bandit") from among a plurality of slot machines, the MAB approach has an exploration phase and an exploitation phase. Options for selection are chosen randomly at the outset, during exploration, and, as user interaction data is received, preferable options are ascertainable and exploited, with a best option eventually distinguishing itself. It follows, then, that more exploration will occur at the beginning of the MAB process and more exploitation occurs as the process progresses.

In particular, using this MAB approach, initial probabilities are set: P(picking), which is equal for all content 100 permutations. A probability P(click) will be based on prior knowledge as it is obtained. Metrics such as clicks and impressions are fetched, and the content selection probabilities are in turn updated. The fetching of metrics and updating of probabilities are repeated as new metrics become available.

A thermometer analogy may prove useful for explaining the back-end, permutation-selection activity, including that utilizing the MAB algorithm. It is well known from chemistry that, given a high temperature, molecules move more randomly. Here, all of the content permutations are considered to have respective "temperatures." As all permutations have equal "temperatures" at the start of the present dynamic optimization process, each has the same chance of being selected for presentation to the users. The permutation temperatures are adjusted as user interaction data is received. The more feedback is received, the more the temperatures are reduced, and the permutations will then "move," or be chosen, in a more predictive way. Eventually, the best MAB "arm" or "lever" is selected.

"Success" can be defined in any number of metrics and ways during the exploration phase, including CTR surveys and purchases made through the systems and methods. Opt-outs, such as when a customer expressly requests to no longer receive an advertisement or all advertisements, can be tracked and utilized as an indicator of an unsuccessful permutation of creative content. Well known and used in the art, CTR is the ratio of users who click on a specific link to the number of total users who view a page, email, or advertisement. Essentially the number of clicks that a given piece of digital content 100 receives divided by the number of times the content 100 is presented to a user. It is commonly used to measure the success of an online advertising campaign for a particular website as well as the effectiveness of email campaign. The more permutations at issue, the more time will be required to sufficiently test and evaluate the various permutations, slowing down the performance of the systems. It should be noted that, if there are many possible permutations or combinations of content 100 elements 104 and low user traffic, the results will not be obtained as quickly as if there were many users providing the requisite feedback in the form of user interaction data.

Bayesian and Other Techniques for Selection Probability Updating

Various models and approaches known in the statistical arts may be practiced to assist in the updating content 100 phase. Bayesian statistics is a known probability-based mathematical approach under which evidence about a state is expressed in terms of degrees of belief known as Bayesian probabilities. Bayesian inferences are used to update the probability for a hypothesis as more evidence or information becomes available. With regard to the updating methodology herein, Bayesian probability can be utilized as a barometer for a random permutation and, given enough feedback and user interaction data, exploit the best permutation. A simple example of how Bayesian updating works may be seen by imagining someone with three coins: an unbiased coin, a heads-biased coin (more likely to show heads), and a tails-biased coin (more likely to show tails). A coin will be repeatedly tossed, and tossing a biased coin:

$Pr(H) = 0.5$
$Toss(10) \rightarrow 4H, 6T$      $P(4H, 6T \mid Pr(H)) \rightarrow P(H)1$
$Toss(10) \rightarrow 2H, 8T$      $P(2H, 8T \mid P(H)1) \rightarrow P(H)2$
...
$P(H)n = 0.3$ The Thompson sampling strategy heuristic method may be used to address the exploration-exploitation dilemma in the MAB problem, by choosing the action that maximizes the expected reward with respect to a randomly drawn belief. It may be desired to exploit all the information present in the network through Boltzmann exploration: instead of always taking the optimal action or taking a random action, this approach involves choosing an action with weighted probabilities relative to expected rewards. In all situations, assume a binomial likelihood and that a conjugate prior follows a beta distribution.

Given a reasonably sufficient amount of consumer or other user traffic, in order to try all content 100 permutations, the present computer-implemented systems and methods could be used for: personalized advertising; evaluating multiple machine learning models in parallel and/or on different markets; and any other parameter tuning, among any number of other applications. For example, it is possible to test three different colors and three different titles, meaning a combination of nine element 104 parameters, and nine different versions of the content 100, can be in play. It will not be necessary to wait an extended period of time or make a manual decision to see which parameter combinations are performing well and which are performing poorly. Then the present systems and methods can dynamically show the best combination as an advertisement, once enough data is obtained.

The references herein to content in the form of advertising are merely for convenience and should not be construed as limiting the disclosure. Indeed, various embodiments of the present systems and methods can be used to dynamically optimize and hone content 100 of all sorts which is presented to a user, including, but not limited to, motion picture or music selections and restaurant recommendations. In fact, anything which has a feedback or input aspect could be experimented and tested. Another envisioned application is to use the disclosed system and methods to test multiple machine learning models and select which model performs best, depending on the market or population.

Systems and Results Testing

A number of options are available to test the results generated by the systems and methods disclosed herein. If desired, the "winning" permutation or combination of elements 104 can be validated by running a standard, controlled AB test against a current creative content 100 implementation. "Smoke" or build verification testing is a type of preliminary software testing that consists of a non-exhaustive set of tests aimed at ensuring that the most important functions in the software work satisfactorily. If desired, smoke tests may be used to test the content rendering engine and/or to check that the likelihood of a permutation being chosen is based on probability (expecting in the latter case the following to be true: impressionsCount ∝ probability).

Further, an offline analysis using mock data can be conducted. Bayesian inference can be used as a first probability updater engine with respect to the behavior of customers for two creative content 100 permutations in a Jupyter Notebook document. The Jupyter Notebook is an open-source web application that allows you to create and share documents that contain live code (e.g., Python), equations, visualizations, and narrative text. Other offline analysis testing can consider real data, collected from a rendering smoke test, to see if the probability of clicks is closer to each other than mockup data.

Figure 3:
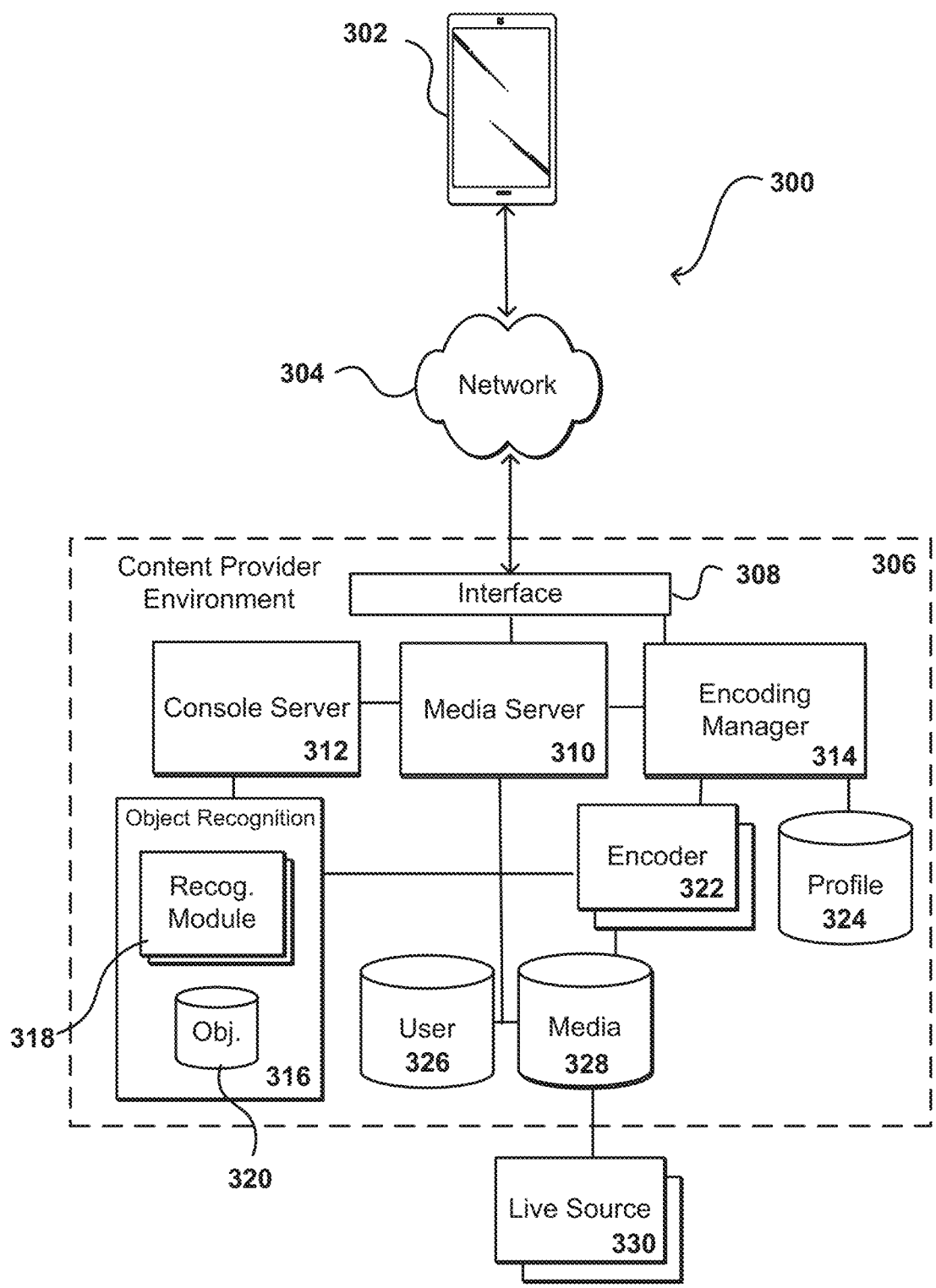
FIG. 3 illustrates an example content management service that can be utilized in accordance with various embodiments.

FIG. 3 illustrates an example content 100 delivery and management system 300 in which aspects of the various embodiments can be implemented. In this example, a client computing device 302 can submit a request across at least one network 304 to be received by a content provider environment 306. This can include a request for specific media or a subscription to have content pushed to the client device 302, among other such options. In at least some embodiments the request can include a request for content to be displayed on, or presented via, the computing device 302, and in many cases will include video, audio, or other media content that is encoded for presentation by the client device 302. The network(s) can include any appropriate network, such as the internet, a local area network (LAN), a cellular network, an Ethernet, or other such wired and/or wireless network. The content provider environment 306 can include any appropriate resources for providing content from a resource provider, as may include various servers, data stores, and other such components known or used for providing content from across a network (or from the "cloud"). As mentioned elsewhere herein, the client computing device 302 can be any appropriate computing or processing device, as may include a desktop or notebook computer, smartphone, tablet, wearable computer (i.e., smart watch, glasses, or contacts), set top box, or other such system or device. An interface layer 308, when receiving a request or call, can determine the type of call or request and cause information to be forwarded to the appropriate component or sub-system. For example, a request for content might be forwarded to a media server 310 while a request to specify encoding parameters or generate an encoding profile might be forwarded to an encoding manager 314 or console server 312, among other such options. These calls or requests can also come from third parties, such as streaming content providers who utilize the resources of the content provider environment 306, and third party providers can provide at least some of the media content to be stored to a media repository 328 and/or encoded for display on the client device 302 as discussed herein. Further, a different type of client device 302 can be used to providing encoding information than is used to consume encoded content.

In this example, a call or request received to the content provider environment 306 can be received by an interface layer 308 of the environment. As known for network environments, the interface layer can include components such as interfaces (e.g., APIs), load balancers, request and/or data routers, and the like. If the request is a request for content, such as for a video data stream to be provided to the client device 302, information for the request can be directed to one or more media servers 310, which can obtain the content from a media data store 328 or other such repository or live media source 330 (or data cache temporarily storing media from the live media source) to be sent back across the network(s) 304 to the client device 302, which can be the device submitting the request or a device identified by the request, among other such options. In some embodiments, information for the request might also be compared against user data in a user data store 326 or other such location to determine, for example, whether the user has access rights to that content, and potentially the formats or versions to which the user has access rights. In at least some embodiments a request from an operator, an administrator, a client device 302, a third party provider, or another such source might include a request to specify one or more sets of encoding parameters to be used with a media file. Accordingly, information regarding the encoding parameters can be provided to an encoding manager 314, or other such component or service, that is able to receive the information through an appropriate interface (i.e., an API or console) and cause the profile and parameter data to be stored to at least one appropriate repository 324 as discussed elsewhere herein. When a request for a video file is received, the encoding manager 314 can use the profile and parameter data to determine the appropriate encoding information, and can pass that to one or more encoders 322, such as may include encoding applications running on one or more allocated servers (physical or virtual), which can obtain the media file and encode the media file per the encoding information, which can then be provided to the client device by a media server 310 or other such component, along with the creative content 100.

Storage media and other non-transitory computer readable media for containing creative content 100, code, or portions of content code, can include any appropriate media known or used in the art, including storage media and communication media, such as, but not limited to, volatile and non-volatile, removable, and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device.

It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HTML, Extensible Markup Language (XML), or another appropriate structured language in this example. The handling of all requests and responses, as well as the delivery of content between the client device 302 and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content 100, tests thereof, and test results. The data store is operable, through logic associated therewith, to receive instructions from a server and obtain, update or otherwise process data in response thereto. Content 100 relating to a particular item of user interest can be viewed in a dedicated page or window of the user's browser.

Figure 4:
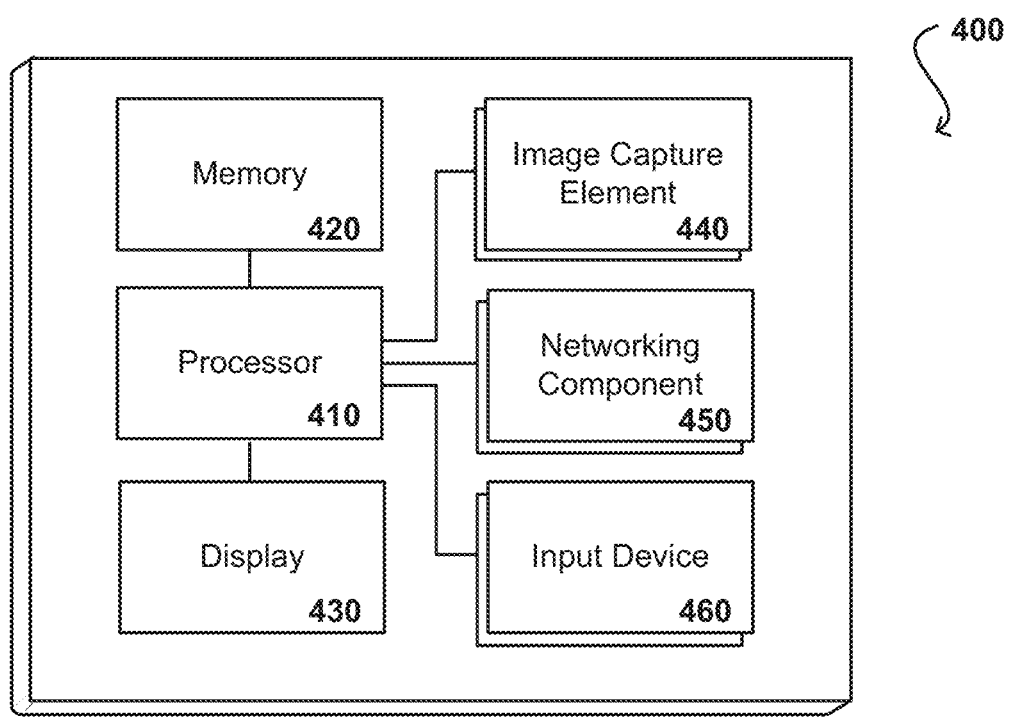
FIG. 4 illustrates components of an example computing device that can be used in accordance with various embodiments.

FIG. 4 illustrates a set of basic components of a computing device 400 that can be used to implement aspects of the various embodiments, including displaying creative content 100 on a client device 302 on a network 304. In this example, the device 400 includes at least one processor 410 for executing instructions that can be stored in a memory device or element 420. As would be apparent to one of ordinary skill in the art, the device can include many types of memory 420, data storage, or computer-readable media, such as a first data storage for program instructions for execution by the at least one processor 410, the same or separate storage can be used for images or data, a removable memory 420 can be available for sharing information with other devices, and any number of communication approaches can be available for sharing with other devices. The device typically will include at least one type of display element 430, such as a touch screen, electronic ink (e-ink), organic light emitting diode (OLED), or liquid crystal display (LCD), although devices such as portable media players might convey information via other means, such as through audio speakers.

The device 400 in some embodiments will include at least one video or image capture element 440, such as at least one video or image capture element 440 positioned to determine a relative position of a viewer and at least one video or image capture element 440 operable to image a user, people, or other viewable objects in the vicinity of the device 400. A video or image capture element 440 can include any appropriate technology, such as a charge-coupled device (CCD) video or image capture element 440 having a sufficient resolution, focal range, and viewable area, to capture video or an image when the user is operating the device 400. Methods for capturing images or video using an image capture element with a computing device are well known in the art and will not be discussed herein in detail. It should be understood that video or image capture can be performed using a single image, multiple images, periodic imaging, continuous image capturing, image streaming, etc. The device 400 can include at least one networking component 450 as well, and may include one or more components enabling communication across at least one network, such as the internet, a cellular network, intranet, extranet, local area network, Wi-Fi, and the like. Accordingly, it is envisioned that creative content 100 may be delivered which relates to images captured by the image capture element 440.

The device 400 can include at least one motion and/or orientation determining element, such as an accelerometer, digital compass, electronic gyroscope, or inertial sensor, which can assist in determining movement or other changes in orientation of the device. The device 400 can include at least one additional input device 460 able to receive conventional input from a user. This conventional input can include, for example, a push button, touch pad, touch screen, wheel, joystick, keyboard, mouse, trackball, keypad, or any other such device or element whereby a user can input a command to the device. These input/output (I/O) devices 460 could even be connected by a wireless infrared, Bluetooth, or other link as well in some embodiments. In some embodiments, however, such a device 400 might not include any buttons at all and might be controlled only through a combination of visual and audio commands such that a user can control the device without having to be in contact with the device.

As noted, the various embodiments can be implemented in a wide variety of operating environments, which in some cases can include one or more user computers, computing devices, or processing devices which can be used to operate any of a number of applications. The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in the accompanying figures. Thus, the depiction of the systems and environments in the figures should be taken as being illustrative in nature and not limiting to the scope of the disclosure.

User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as Transmission Control Protocol/Internet Protocol (TCP/IP), Open System Interconnection (OSI), File Transfer Protocol (FTP), Universal Plug and Play (UpnP), Network File System (NFS), Common Internet File System (CIFS), and AppleTalk. The network can be, for example, a local area network, a wide-area network, a virtual private network, the Internet, an intranet, an extranet, a public switched telephone network, an infrared network, a wireless network, and any combination thereof In embodiments utilizing a Web server, the Web server can run any of a variety of server or mid-tier applications, including Hypertext Transfer Protocol (HTTP) servers, File Transfer Protocol (FTP) servers, Common Gateway Interface (CGI) servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

Based on the disclosure and teachings provided herein, a person of ordinary skill in the art will appreciate other ways and/or methods to implement the various embodiments. The specification and drawings are, accordingly, to be regarded in an illustrative, rather than a restrictive, sense. It will be evident that various modifications and changes may be made thereunto without departing from the broader spirit and scope of the invention as set forth in the claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

What is claimed is:

1. A computer-implemented method, comprising:
obtaining creative content including a plurality of image and textual elements, the image and textual elements having a plurality of variable parameters;
selecting initial permutations of the creative content, based at least in part on application of a random number;
displaying, on a computing device display, the initial permutations of the creative content;
generating a plurality of creative content permutations, corresponding to the creative content, using the plurality of image and textual elements and parameter settings from among the variable parameters, the creative content permutations having respective selection probabilities;
automatically selecting display content, from the plurality of creative content permutations, based on a highest selection probability for a corresponding creative content permutation, the highest selection probability based at least in part on one or more multi-armed bandit algorithms processing the content permutations' respective selection probabilities;
rendering the display content for display;
obtaining user interaction data corresponding to the display content;
recalculating at least one of the respective selection probabilities based at least in part upon the user interaction data;
generating updated display content, based at least in part on the recalculating at least one of the respective selection probabilities; and
displaying, on the computing device display, the display content.

2. The computer-implemented method of claim 1, further comprising: analyzing the user interaction data according to predetermined metrics including click-through rate.

3. The computer-implemented method of claim 1, further comprising:
storing and accessing the variable parameters through use of a plurality of respective parameter identifications.

4. A computer-implemented method, comprising:
obtaining content including a plurality of elements, the elements having a plurality of variable parameters;
selecting initial permutations of the content, based at least in part on application of a random number;
displaying, on a computing device display, the initial permutations of the content;
generating a plurality of content permutations, corresponding to the content, using parameter settings from among the variable parameters, the content permutations having respective selection probabilities;
selecting display content, from the plurality of content permutations, based on the selection probability for a corresponding content permutation, the selection probability for the corresponding content permutation determined at least in part on one or more multi-armed bandit algorithms processing the content permutations' respective selection probabilities;
rendering the display content for display; and
displaying, on the computing device display, the display content.

5. The computer-implemented method of claim 4, further comprising:
obtaining user interaction data corresponding to the display content; and
recalculating at least one of the respective selection probabilities based at least in part upon the user interaction data.

6. The computer-implemented method of claim 4, further comprising:
analyzing the user interaction data according to predetermined metrics, including click-through rate and opt-outs.

7. The computer-implemented method of claim 4, further comprising:
categorizing the plurality of content permutations into domains, based on functions of the respective elements within the content permutations; and
revising the content by domain.

8. The computer-implemented method of claim 4, further comprising:
obtaining templates for rendering the display content for display, the templates having determined sizes and locations for the plurality of elements.

9. The computer-implemented method of claim 4, further comprising:
selecting visual elements to serve as the plurality of elements.

10. The computer-implemented method of claim 4, further comprising:
storing and accessing the variable parameters through use of a plurality of respective parameter identifications.

11. A computing system, comprising:
at least one processor; and
memory including instructions that, when executed by the at least one processor, cause the computing system to:
obtain content including a plurality of elements, the elements having a plurality of variable parameters;
selecting initial permutations of the content, based at least in part on application of a random number;
displaying, on a computing device display, the initial permutations of the content;
generate a plurality of content permutations, corresponding to the content, using parameter settings from among the variable parameters, the content permutations having respective selection probabilities;
select display content, from the plurality of content permutations, based on the selection probability for a corresponding content permutation, the selection probability for the corresponding content permutation determined at least in part on one or more multi-armed bandit algorithms processing the content permutations' respective selection probabilities;
render the display content for display; and
displaying, on the computing device display, the display content.

12. The computing system of claim 11, wherein the instructions when executed further cause the computing system to:
obtain user interaction data corresponding to the display content; and
recalculate at least one of the respective selection probabilities based at least in part upon the user interaction data.

13. The computing system of claim 11, wherein the instructions when executed further cause the computing system to:
analyze the user interaction data according to predetermined metrics, including click-through rate and opt-outs.

14. The computing system of claim 11, wherein the instructions when executed further cause the computing system to:
   categorize the plurality of content permutations into domains, based on functions of the respective elements within the content permutations; and
   revise the content by domain.

15. The computing system of claim 11, wherein the instructions when executed further cause the computing system to:
   select visual elements to serve as the plurality of elements.

* * * * *